United States Patent Office

2,899,405
Patented Aug. 11, 1959

2,899,405

POLYMERIZATION OF VINYL CHLORIDE OR VINYLIDENE CHLORIDE IN THE PRESENCE OF ISOLATED POLYMERS

Harry W. Coover, Jr., Kingsport, Tenn., assignor to Eastman Kodak Company, Rochester, N.Y., a corporation of New Jersey No Drawing. Application November 26, 1954
Serial No. 471,501

5 Claims. (Cl. 260—45.5)

This invention relates to the production of modified polymers of vinyl chloride or vinylidene chloride, and to articles prepared therefrom.

It is known that both vinyl chloride and vinylidene chloride give rise to polymers noted for their high softening temperature and excellent mechanical properties. However, it is also known that polymers of vinyl chloride and vinylidene chloride possess the undesirable property of lacking dye affinity.

Attempts have been made to increase the dyeability of vinyl chloride and vinylidene chloride fibers by interpolymerizing vinyl chloride or vinylidene chloride with certain monomers whose polymers have an affinity for dyes. While this procedure does give polymer products, from which fibers having good dyeing properties can be obtained, a serious drawback frequently occurs, a substantial lowering of the softening point of the fiber being observed.

Other attempts have been made to increase the dyeability of polyvinylidene chloride or polyvinyl chloride fibers by mixing them, before spinning, with other polymeric materials which are dye-susceptible. This procedure, likewise, provides fibers having good dyeing properties, however, many of these fibers show a low softening temperature, and in addition, many show segmentation into their individual components along their horizontal axis. For example, it can be demonstrated that mixtures of polyvinyl acetate and polyvinyl chloride, when dissolved in either N,N-dimethylformamide or N,N-dimethylacetamide in proportions varying from 15 to 50% of polyvinyl acetate, based on the total weight of the mixed polyvinyl acetate and polyvinyl chloride, form grainy dopes which separate into two liquid layers on standing. This is also true of many other polymeric materials, natural or synthetic, which are soluble in the above solvents. Fibers which form from these non-homogeneous solutions or mixtures are too low in softening temperature to be of practical value, and are also subject to the defect of segmentation. This is not surprising because of the non-homogeneous condition of the spinning solution and the fact that it is generally known that polyvinyl chloride, or polyvinylidene chloride, is not compatible with many organic substances.

I have now made the unusual and valuable discovery that stable solutions of vinyl chloride or vinylidene chloride polymers, which do not separate into distinct layers on standing, and from which fibers of good dyeability can be spun, can be prepared by polymerizing vinyl chloride or vinylidene chloride (alone or in the presence of another polymerizable monomer) in the presence of certain preformed isolated polymers, which have an affinity to organic dyes. These fibers are characterized by a softening point higher than that of the interpolymers referred to above and do not exhibit the segmentation defect shown by many of the fibers prepared from certain prior art mixtures comprising polyvinyl chloride or polyvinylidene chloride. Fibers prepared according to my invention also have a softening point higher than fibers prepared from simple interpolymers of vinyl chloride or vinylidene chloride with monomers which have the property of imparting dye affinity to the polymer products. The polymers used for imparting dye affinity to the vinyl chloride or vinylidene chloride polymers of my invention have been separated from the polymerization mixture prior to the addition of the vinyl chloride or vinylidene chloride, thus distinguishing them from the products obtained in my copending applications Serial Nos. 471,502 and 471,503, both filed on even date herewith. A particular advantage of the invention resides in the fact that the chloride polymers of this invention are non-inflammable, while retaining the other desirable characteristics, when the chloride monomer is employed at concentrations as low as 30% by weight based on the total weight of monomeric material which is polymerized with the preformed isolated polymer. This is of great importance in the manufacture of textile fabrics from polymeric fibers embodying the invention. Another very useful characteristic of the polymers embodying the invention is their increased solubility in many organic solvents as compared to the difficultly soluble polyacrylonitrile polymers. This enhanced solubility is readily achieved at low conversions using batch processes; and, even at conversions of the order of 90% or more, polymers having good solubility in such well known solvents as acetone are readily prepared by continuous processes such as are disclosed in the copending application of Wooten and Shields, Serial No. 471,-498, filed concurrently herewith.

It is, therefore, an object of my invention to provide new and improved vinyl chloride or vinylidene chloride polymer compositions. A further object of my invention is to provide methods of making these modified polymer compositions. Still another object is to provide homogeneous solutions obtained from these polymer compositions comprising vinyl chloride or vinylidene chloride. Another object is to provide fibers from these homogeneous solutions, and methods for making these fibers. Another object is to provide composite unitary polymers which are not inflammable and which have high softening temperatures, excellent mechanical properties, particularly in fiber form, and improved solubility and dyeing characteristics. Other objects will become apparent from a consideration of the following description and examples and the appended claims.

Since my invention relates both to the preparation of polymers of vinyl chloride and vinylidene chloride, for the sake of convenience, these monomers are hereinafter referred to as the chloride monomers. The polymers are similarly referred to.

The preformed isolated polymers which are useful in imparting dye affinity to the vinyl chloride or vinylidene chloride polymers of my invention comprise homopolymers and interpolymers of the acrylamides, maleamides, fumaramides, itaconamides, citraconamides, maleamates, fumaramates, itaconamates, citraconamates, and acrylates. The acrylamides have been found especially useful when used according to my invention.

As acrylamides, I can advantageously use in my invention those represented by the following general formula:

(I)
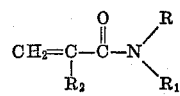

wherein R and $R_1$ each represents a hydrogen atom or an alkyl group containing from 1 to 4 carbon atoms (e.g. methyl, ethyl, propyl, isopropyl, butyl, isobutyl, etc. groups) and $R_2$ represents a hydrogen atom or a methyl group. Typical acrylamides include, for example, acrylamide, N-methylacrylamide, N-ethylacrylamide, N-isopropylacrylamide, N-n-butylacrylamide, N,N-dimethylacrylamide, N,N-diethylacrylamide, methacrylamide, N-methylmethacrylamide, N-ethylmethacrylamide, N-isopropylmethacrylamide, N,N - dimethylmethacrylamide, etc. N-cyclohexyl acrylamides can also be used.

As maleamides, I can advantageously use those represented by the following general formula:

(II)
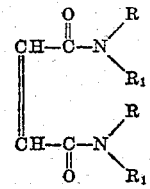

wherein R and $R_1$ each have the values given above. Typical maleamides include, for example, maleamide, N-methylmaleamide, N - ethylmaleamide, N - propylmaleamide, N - isopropylmaleamide, N - n - butylmaleamide, N,N'-dimethylmaleamide, N,N'-diethylmaleamide, N,N'-di-n-butylmaleamide, N,N'-methylethylmaleamide, N,N'-tetramethylmaleamide, N,N'-tetraethylmaleamide, N,N'-dimethyl-N,N'-diethylmaleamide, etc.

As fumaramides, I can advantageously use those represented by the following general formula:

(III)
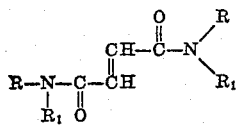

wherein R and $R_1$ each have the values given above. Typical fumaramides include, for example, fumaramide, N-methylfumaramide, N-ethylfumaramide, N-propylfumaramide, N - isopropylfumaramide, N - n - butylfumaramide, N,N'-dimethylfumaramide, N,N'-diethylfumaramide, N,N' - di - n - butylfumaramide, N-ethyl-N' - methylfumaramide, N - n - butyl - N' - methylfumaramide, N,N' - tetramethylfumaramide, N,N' - tetraethylfumaramide, N,N - diethyl - N',N' - dimethylfumaramide, etc.

As itaconamides, I can advantageously employ those represented by the following general formula:

(IV)
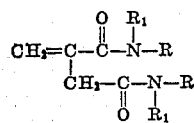

wherein R and $R_1$ each have the values given above. Typical itaconamides include, for example, itaconamide, N - methylitaconamide, N - ethylitaconamide, N -propylitaconamide, N,N' - dimethylitaconamide, N,N' - diethylitaconamide, etc.

As citraconamides, I can advantageously employ those represented by the following general formula:

(V)
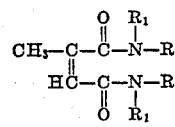

wherein R and $R_1$ each have the values given above. Typical citraconamides include, for example, citraconamide, N-methylcitraconamide, N-ethylcitraconamide, N - n - butylcitraconamide, N,N' - dimethylcitraconamide, N,N' - diethylcitraconamide, the N,N' - butylcitraconamides, N,N'-tetramethylcitraconamide, etc.

The maleamates useful in practicing my invention comprises those represented by the following general formula:

(VI)
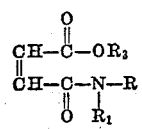

wherein R and $R_1$ each have the values given above, and $R_3$ represents an alkyl group of from 1 to 4 carbon atoms (e.g. methyl, ethyl, propyl, isopropyl, n-butyl, isobutyl, etc.). The typical are methyl maleamate, propyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously employ those represented by the following general formula:

(VII)
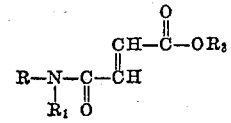

wherein R and $R_1$, and $R_3$ each have the values given above. Typical are methyl fumaramate, ethyl fumaramate, propyl fumaramate, n-butyl fumaramate, methyl N-methylfumaramate, ethyl N-methylfumaramate, the butyl N-methylfumaramates, methyl N-dimethylfumaramates, ethyl N-dimethylfumaramates, n-butyl N-dimethylfumaramate, the methyl N-dibutylfumaramates, etc.

As itaconamates, I can advantageously employ those represented by the following general formulas:

(VIII)
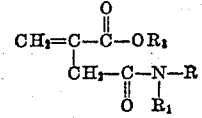

and (VIIIa)
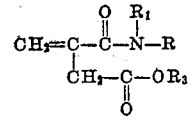

wherein R, $R_1$, and $R_3$ each have the values given above. Typical itaconamates include, for example, methyl itaconamate, ethyl itaconamate, propyl itaconamate, the butyl itaconamates, methyl N-methylitaconamate, ethyl N-methylitaconamate, propyl N-methylitaconamate, n-butyl N-methylitaconamate, methyl N-dimethylitaconamate, ethyl N-dimethylitaconamate, n-butyl N-dimethylitaconamate, the methyl N-dibutylitaconamates, etc.

As citraconamates, I can advantageously employ those represented by the following general formulas:

(IX)
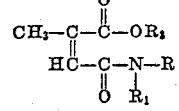

and (IXa)
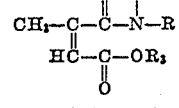

wherein R, $R_1$, and $R_3$ each have the values given above. Typical citraconamates include, for example, methyl citraconamate, ethyl citraconamate, propyl citraconamate, the butyl citraconamates, methyl N-methylcitraconamate, ethyl N-methylcitraconamates, propyl N-methylcitraconamates, n - butyl N - methylcitraconamate, methyl N-dimethylcitraconamate, ethyl N-dimethylcitraconamate, n-butyl N-dimethylcitraconamate, the methyl N-dibutylcitraconamates, etc.

As acrylates, I can advantageously employ those represented by the following general formula:

(X)
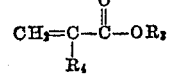

wherein $R_3$ has the values given above, and $R_4$ represents a hydrogen atom, a methyl group, or an ethyl group.

Typical acrylates include, for example, methyl acrylate, ethyl acrylate, propyl acrylate, isopropyl acrylate, butyl acrylate, methyl methacrylate, ethyl methacrylate, propyl methacrylate, n-butyl methacrylate, isopropyl methacrylate, methyl ethacrylate, ethyl ethacrylate, etc.

In practicing my invention, polymerization is effected of a mixture of 5–95% by weight of a preformed isolated polymer which can be either a homopolymer of a compound selected from those represented by Formulas I to X inclusive or an interpolymer of any of such compounds with each other or with a different polymerizable ethenoid compound as hereinafter described, and 95–5% of monomeric material consisting of either chloride monomer alone, or a mixture of the chloride monomers, or a mixture of either or both of the chloride monomers with one or more ethenoid monomers which can include any of the compounds of the Formulas I–X as well as any of the other copolymerizable monoethylenically unsaturated ethenoid monomers described hereinafter. The preformed isolated polymer is dispersed in a liquid medium and the chloride monomer (alone or together with another polymerizable monomer) is added and the polymerization completed. Those compositions containing from about 60 to 95% by weight of the chloride component (i.e. the total monomeric material polymerized with the preformed polymer and consisting of either of the chloride monomers alone or in admixture with each other or with another polymerizable monomer, is herein collectively referred to as the chloride component) have been found to be useful as fiber forming materials, and are compatible with polyvinyl chloride or polyvinylidene chloride (the monomer of the chloride component corresponding to that of the polyvinyl or polyvinylidene chloride) which have been found to be substantially homogeneous in character. The monomeric material employed for preparing the fiber-forming polymers embodying the invention can contain anywhere from 30 to 100% by weight of the chloride component as vinyl or vinylidene chloride and up to 70% by weight of another monoethylenic material, and still give non-inflammable polymers. Thus fibers formed from these polymers can be woven into textile fabrics which will not sustain combustion in themselves, a characteristic of considerable utility in the textile field and particularly as regards wearing apparel. The compositions containing from 5 to 60% by weight of chloride component can be added directly to polymers containing at least 85% by weight of vinyl chloride or vinylidene chloride units to form compatible mixtures useful for fiber applications, or the compositions can be left in their reaction medium after the polymerization in accordance with this invention has been effected and preferably is substantially (90–100%) complete, and sufficient additional chloride monomer (corresponding to that in the polymer and the reaction medium) can be added to produce a final product containing from 60 to 95% by weight of chloride component and useful in the preparation of fibers of high softening point and ready susceptibility to dyeing by polymerizing such additional monomer in the presence of the product in the polymerization mixture.

As noted above, either an isolated homopolymer of a monomer selected from those represented by Formulas I to X, or an interpolymer of such a monomer (I) with another (different) monoethylenically-usaturated polymerizable compound (II) containing a (XI)      —CH=C< group, can be employed in my invention. Thus the preformed isolated polymer can contain from 1–100% by weight, in polymerized form, of a monomer (I) which can be any of the compounds of the Formulas I–X and 99–0% by weight, in polymerized form of a different monoethylenically unsaturated polymerizable compound (II), based on the combined weights of monomer (I) and compound (II).

As noted above, according to my invention, the preformed polymer can include an interpolymer of any of the monomers (I) represented by the Formulas I–X with a different monoethylenically unsaturated, polymerizable compound, such as represented by those of Formula XI above and including others of Formulas I–X, and the chloride monomer can also undergo polymerization alone or in the presence of a different compound (II) as represented by Formula XI. Compounds representative of those of Formula XI include those represented by Formulas I to X above, in addition to such other compounds as vinyl esters having the formula

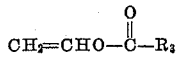

where $R_3$ has the value given above, styrene, α-methylstyrene, p-acetaminostyrene, α-acetoxystyrene, vinyl chloride (when chloride monomer is vinylidene chloride), vinylidene chloride (when chloride monomer is vinyl chloride), ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, 2-vinyl pyridine, 5-vinyl pyridine, 2-methyl-5-vinyl pyridine, methacrylic acid, fumaronitrile, acrylonitrile, methacrylonitrile, N-vinylphthalimide, ethylene, etc. Especially useful polymerizable compounds coming within the scope of Formula XI comprise those containing a (XII)      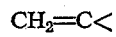

group. The amount of other monoethylenically-unsaturated, polymerizable compound used with the chloride monomer varies from 0 to 70%, based on the combined weights of the chloride monomer and the other monomer, i.e. the chloride monomer represents the "remaining" 30 to 100% of the monomeric material polymerized with the preformed monomer. A particularly useful combination is one consisting of from 40 to 99 percent of the chloride monomer and from 60 to 1 percent of the other monomer.

The polymerization must be carried out in the presence of a dispersing medium, such as water, mixtures of water with acetone, ethanol, dioxane, etc. By dispersing medium is meant a medium producing a dispersion, i.e. a true solution or a colloidal dispersion.

The polymerization can be accelerated by heat, by actinic light and by the use of a well known polymerization catalyst. Such catalysts are commonly used in the art of polymerization, and my invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal and ammonium persulfates), etc. Other catalysts such as the ketazines, azines, etc. can be used. The quantity of catalyst used can be varied, depending on the monomer, amount of diluent, etc. Generally, from 0.1 to 5% by weight, based on the weight of monomers being polymerized, is sufficient for the purposes of my invention.

The temperature at which the process of my invention can be carried out is not critical. Generally, a temperature of from 15° to 75° is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amines, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e.g. potassium, sodium, etc. bisulfites) can be added to reduce the time required for the polymerization to be effected.

The polymerization can be carried out batchwise but is more desirably carried out in continuous fashion. The products formed by continuous processes have a number of advantages. They are more homogeneous and have certain improved properties such as improved solubility over products obtained from analogous batch processes. The continuous processes contemplated herein fall into two main groups: (1) those which are carried out in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). In the preferred process, the chloride monomer alone or with another monomer or monomers containing a regulator such as tertiary dodecyl mercaptan is placed in a suitable storage or supply tank under an atmosphere of nitrogen. In another supply tank, under nitrogen, is charged air-free deionized water containing other reactants including the preformed isolated polymer, the polymerization catalyst, and an acidic reagent such as phosphoric acid for regulating the pH of the reaction mixture. A third tank contains the reducing agent or activator such as potassium metabisulfite in solution in air-free deionized water.

The preferred procedure is to continuously draw the appropriate amounts of solutions or dispersions from the supply vessels into a reactor, subject the mixture to polymerizing conditions and continuously withdraw the graft polymer product from the reactor. By this means, the monomer or monomers are continuously graft polymerized with the preformed polymer at conversions of 70–90% or more of the monomeric material. The length of time between the addition of any increment of reactants to the reactor and the removal of the polymer formed therefrom is defined as the contact time. At equilibrium, the polymer emulsion or slurry is removed from the reactor by suitable means at the same total rate that the ingredients are being added from the supply tanks. Thus, the contact time in the reactor can be conveniently controlled by the absolute rate of addition of the reactants. Usually, the contact time is between 1 and 3 hours, although longer periods are advantageous in some cases. Although the described procedure is preferred, the process can be varied in a number of ways. For example, the ingredients to be added can be combined or separated by using a smaller or larger number of supply tanks, with the practical minimum being two supply tanks, one for the activator and the other for the remaining ingredients.

The preferred continuous process gives a highly uniform product having excellent solubility characteristics. Thus, for example, graft polymers can be prepared with 15–25% by weight of preformed polymer, such as an acrylamide homo- or copolymer, and 85–75% by weight of monomeric material consisting of 40–60% vinyl or vinylidene chloride and 60–40% acrylonitrile, and such polymers are readily soluble in acetone to give solutions from which textile fibers of high softening temperature, good tensile strength and elongation, good dyeability and non-inflammability can be readily spun by the usual fiber spinning techniques.

Although the continuous process is preferred, a batch or continuous batch process can be employed with good results. In the continuous batch processes, the various ingredients of the polymerization mixture can be added to the reactor in various ways. Thus, the catalyst, activator, isolated polymer, water, etc. can be charged to the reactor in a batch and the monomeric material and regulator added continuously; the monomeric material, regulator, catalyst, isolated polymer, water, etc. can be charged to the reactor and the activator added continuously; the monomer, regulator, activator, isolated polymer, water, etc. can be charged to the reactor and the catalyst added continuously; or the monomer, isolated polymer, regulator, water, etc. can be charged to the reactor and the catalyst and activator added continuously, either together or separately.

The following examples will serve to illustrate more fully the manner whereby I practice my invention.

*Example 1*

2 grams of poly N-methyl acrylamide were dissolved in 100 cc. of water containing 0.1 gram of ammonium persulfate, 0.1 gram of potassium bisulfite and 8 grams of vinyl chloride. The resulting solution was allowed to polymerize for 16 hours at 25° C. The resulting polymer was filtered off. After drying, there was obtained a product weighing 9.3 grams and was found to contain 19 percent by weight of N-methyl acrylamide on analysis. Solutions of our new compositions of matter are readily spun into fibers by dry spinning or by wet spinning into suitable coagulating baths. Fibers obtained by preparing a solution of the polymer obtained above in dimethylformamide and extruding the solution into a precipitating bath had a tenacity of 3.5 grams per denier, an extensibility of 32 percent and a sticking temperature above 165° C.

*Example 2*

3 grams of an interpolymer of acrylonitrile and N-methyl methacrylamide containing 76 percent by weight of N-methyl methacrylamide were dissolved in 100 cc. of water along with 0.1 gram of ammonium persulfate and 0.1 gram of potassium bisulfite. The resulting solution was tumbled end over end for 18 hours at 25° C. and 7 grams of vinylidene chloride were then added and the polymerization allowed to continue for 48 hours at 25° C. The resulting polymeric material was precipitated by the addition of acetone and then collected by centrifuging. After drying, there was obtained 9.6 grams of polymeric material containing 19 percent by weight of N-methyl methacrylamide. Fibers were then spun by extruding a solution of the polymer in dimethylformamide into a precipitating bath. The fibers thus obtained had a tenacity of 3.6 grams per denier, and extensibility of 26 percent, a sticking temperature above 195° C. and shrank only 10 percent in boiling water. These fibers showed an excellent affinity for acetate, direct, vat and acid dyes and they did not stiffen or stick together in the dye bath. The polymer can be mixed with polyvinylidene chloride in all proportions and dissolved to give stable solutions which do not separate into distinct layers on standing and from which fibers and films of homogeneous character can be spun, extruded or cast.

*Example 3*

1 gram of poly N-isopropyl acrylamide was added to 60 cc. of water containing 1 cc. of 7-ethyl-2-methyl undecane-4-sulfonic acid sodium salt (Tergitol No. 4). The mixture was then tumbled end over end for 1 hour at 50° C. The solution was cooled and 8 grams of vinyl chloride, 0.5 gram of methylacrylate, 0.1 gram of ammonium persulfate and 0.1 gram of sodium bisulfite were added. The polymerization was effected by tumbling for 12 hours at 25° C. The polymer was obtained in a 93 percent yield and contained approximately 9 percent isopropyl acrylamide on analysis. Fibers spun by extruding a solution of this polymer in dimethylacetamide into a precipitating bath had a tenacity of 3.6 grams per denier, an extensibility of 28 percent and a sticking temperature above 160° C.

Example 4

3 grams of an interpolymer of N,N-dimethyl acrylamide and vinyl acetate containing 60 percent by weight of N,N-dimethyl acrylamide were dissolved in 50 cc. of a 50 percent solution of acetonitrile in water. There were then added 3 grams of vinylidene chloride, 3 grams of vinyl acetate, 0.1 gram of ammonium persulfate and 0.1 gram of sodium bisulfite. The polymerization was effected by heating for 12 hours at 40° C. The precipitated polymer was obtained in a 92 percent yield and contained approximately 29 percent by weight of the amide-vinyl acetate interpolymer upon analysis. Fibers spun by extruding a solution of the polymer in acetone into a precipitating bath had a tenacity of 3.1 grams per denier, an extensibility of 43 percent and a sticking temperature above 120° C. The fibers showed an excellent affinity for acetate, direct, vat and acid dyes. The polymer can be mixed with polyvinylidene chloride or copolymers of vinylidene chloride containing 50 percent or more of vinylidene chloride in all proportions and dissolved to give stable solutions which do not separate into distinct layers on standing and from which fibers and films of homogeneous character can be spun, extruded or cast.

Example 5

2 grams of an interpolymer of N-methyl acrylamide and acrylamide containing 30 percent by weight of N-methyl acrylamide were added to 70 cc. of water containing 0.1 gram of sodium bisulfite, 0.1 gram of ammonium persulfate, 5.4 grams of vinyl chloride and 3.6 grams of acrylonitrile. The resulting solution was then polymerized for 16 hours at 35° C. The polymer was filtered off and then dried. It was obtained in a 93 percent yield and was found to contain 17 percent by weight of N-methyl acrylamide interpolymer on analysis. Fibers spun by extruding a solution of this polymer in dimethylformamide into a precipitating bath had a softening point above 145° C. and showed excellent dye affinity.

Example 6

4 grams of poly N,N-dimethyl methacrylamide were dissolved in 75 cc. of acetonitrile containing 6 grams of vinylidene chloride, 0.5 gram of vinyl chloride and 0.3 gram of benzoyl peroxide. The resulting solution was then heated for 24 hours at 50° C. and then cooled. The precipitated polymer was collected on a filter, washed and dried. It was found to contain approximately 39 percent by weight of N,N-dimethyl methacrylamide on analysis. Fibers obtained from this polymer had a sticking temperature above 180° C. and showed excellent dye affinity.

Example 7

3 grams of an interpolymer of citraconic acid diamide and methyl methacrylate containing 28 percent by weight of the diamide were emulsified in 100 cc. of water containing 3 cc. of a sulfonated ether (Triton 720). There were then added 3.5 grams of vinyl chloride, 3.5 grams of vinylidene chloride, 0.15 gram of potassium persulfate and 0.1 gram of sodium bisulfite. The resulting emulsion was heated for 16 hours at 35° C. and then cooled to room temperature. The precipitated polymer was collected on a filter, washed and dried. It contained 29.5 percent by weight of the citraconic acid diamide methyl methacrylate interpolymer on analysis. Fibers obtained from this polymer product had a sticking temperature above 160° C. and showed excellent dye affinity.

Example 8

2 grams of poly N,N'-dimethyl itaconic acid diamide are emulsified in 80 cc. of water containing 3 cc. of 7-ethyl-2-methyl undecane-4-sulfonic acid sodium salt (Tergitol No. 4). There were then added 7 grams of vinylidene chloride, 1 gram of methacrylonitrile, 0.1 gram of potassium persulfate and 0.1 gram of sodium bisulfite and the emulsion was heated at 35° C. for 12 hours with tumbling. The emulsion was then cooled to room temperature, the precipitated polymer filtered off, washed with distilled water and dried. It was found to contain approximately 21 percent by weight of N,N-dimethyl itaconic diamide. Fibers spun by extruding a solution of this polymer in dimethyl acetamide into a precipitating bath had a tenacity of 3.8 grams per denier, an extensibility of 26 percent and shrank only 10 percent in boiling water. Fibers showed excellent affinity for all classes of dyes.

Example 9

3 grams of an interpolymer of acrylamide and methyl acrylate containing 80 percent by weight of acrylamide were dissolved in 100 cc. of water containing 0.1 gram of potassium persulfate, 0.1 gram of sodium bisulfite, 6 grams of vinylidene chloride and 1 gram of acrylonitrile. The resulting solution was then heated for 16 hours at 35° C. The solution was cooled to room temperature and the precipitated polymer filtered off, washed with distilled water and finally dried. It was obtained in a 93 percent yield and was found to contain approximately 29.5 percent by weight of the acrylamide methyl acrylate interpolymer on analysis. Fibers obtained from this polymer had a sticking temperature above 185° C. and showed excellent affinity for dyes.

Example 10

3 grams of poly N-methyl methacrylamide were dissolved in 100 cc. of water to which 0.1 gram of ammonium persulfate, 0.1 gram of sodium bisulfite, 6 grams of vinyl chloride and 1 gram of dimethyl fumaramate were added. The resulting solution was heated for 12 hours at 30° C., then cooled to room temperature. The precipitated polymer was filtered off, washed with distilled water and then dried. It was found to contain 29.3 percent by weight of N-methyl methacrylamide on analysis. Fibers were then spun from this product by extruding a solution thereof in N,N-dimethylformamide into a precipitating bath. The fibers thus obtained had a tenacity of 3.6 grams per denier, an extensibility of 28 percent and a sticking temperature above 165° C.

Example 11

1 gram of poly methyl fumaramate was added to 60 cc. of water containing 1 cc. of 7-ethyl-2-methyl undecane-4-sulfonic acid sodium salt (Tergitol No. 4). The mixture was then tumbled end over end for 1 hour at 50° C. The solution was cooled and 7 grams of vinyl chloride, 2 grams of N-methyl acrylamide, 0.1 gram of ammonium persulfate and 0.1 gram of sodium bisulfite were added. The polymerization was effected by tumbling for 16 hours at 25° C. The polymer was obtained in a 93 percent yield and contained 10 percent by weight of methyl fumaramate. Fibers spun from the above polymer had a softening point above 160° C. and showed excellent affinity for dyes.

Example 12

3 grams of an interpolymer of N-methyl methyl maleamate and vinyl acetate containing 60 percent by weight of N-methyl methyl maleamate were dissolved in 50 cc. of a 50 percent solution of acetonitrile in water. There were then added 6 grams of vinyl chloride, 0.1 gram of ammonium persulfate and 0.1 gram of sodium bisulfite. The polymerization was effected by heating for 16 hours at 40° C. The precipitated polymer was obtained in a 92 percent yield and contained 29 percent by weight of the amide vinyl acetate interpolymer upon analysis. Fibers obtained from the polymer had a softening temperature above 165° C. and showed excellent affinity for dyes. Fibers obtained from a solution of a mechanical mixture of 25 parts polyvinyl chloride and 75 parts of the above-described polymer and extruding the solution into a precipitating bath had a tenacity of 3.8 grams per denier, an extensibility of 29 percent and a sticking temperature above 165° C.

Example 13

2 grams of an interpolymer of N,N-dimethyl methyl itaconamate and acrylamide containing 30 percent by weight of itaconamate were added to 70 cc. of water containing 0.1 gram of sodium bisulfite, 0.1 gram of ammonium persulfate and 9 grams of vinylidene chloride. The resulting solution was then polymerized for 16 hours at 35° C. The polymer was filtered off and then dried. The polymer contained 17 percent by weight of the itaconamate acrylamide interpolymer on analysis.

Example 14

4 grams of poly N,N-dimethyl ethyl citraconamate were dissolved in 75 cc. of acetonitrile containing 3.5 grams of vinylidene choride, 3 grams of vinyl chloride and 0.3 gram of benzoyl peroxide. The resulting solution was then heated for 24 hours at 50° C. and then cooled. The precipitated polymer was collected on a filter, washed and dried. It was found to contain approximately 39 percent by weight of N,N-dimethyl ethyl citraconamate on analysis. Fibers obtained from this polymer had a sticking temperature above 155° C. and showed excellent dye affinity.

Example 15

2 grams of poly N,N'-di-isopropyl maleamide were emulsified in 80 cc. of water containing 3 cc. of 7-ethyl-2-methyl undecane-4-sulfonic acid sodium salt (Tergitol No. 4). There were then added 6.5 grams of vinyl chloride, 1.5 grams of dimethyl maleate, 0.1 gram of potassium persulfate and 0.1 gram of sodium bisulfite. The emulsion was then heated at 35° C. for 16 hours with tumbling. The emulsion was then cooled to room temperature, the precipitated polymer filtered off, washed with distilled water and dried. It was found to contain 20.5 percent by weight of the maleamide. Fibers spun by extruding a solution of this polymer in dimethyl acetamide into a precipitating bath had a tenacity of 3.9 grams per denier, an extensibility of 29 percent and shrank only 10 percent in boiling water.

Example 16

9 grams of an interpolymer of N,N-dimethyl butyl itaconamate and N-ethyl isopropyl citraconamate containing 80 percent by weight of the itaconamate were emulsified in 80 cc. of water containing 3 cc. of 7-ethyl-2-methyl undecane-4-sulfonic acid sodium salt (Tergitol No. 4). There was then added 0.5 gram of vinyl chloride, 0.5 gram of acrylonitrile, 0.05 gram of potassium persulfate, 0.05 gram of sodium bisulfite and the emulsion was heated at 35° C. for 16 hours with tumbling. The emulsion was then cooled to room temperature, the precipitated polymer filtered off, washed with distilled water and dried. A solution of a mechanical mixture of 50 parts of polyvinyl chloride and 50 parts of the above polymer was cast to give a clear, tough film.

Example 17

The improved properties of the chloride polymers embodying the invention are obtained even when the chloride monomer amounts to less than 50% of the monomeric material. Thus, the chloride monomer can form as low as 30% of the monomeric material in fiber forming polymers and give fibers which are non-inflammable. For example, 2.5 g. of poly-N-isopropylacrylamide was dissolved in 100 cc. of water containing 0.1 g. of potassium persulfate, 0.1 g. of potassium metabisulfite, 2.25 g. of vinylidene chloride and 5.25 g. of acrylonitrile. The resulting solution was then heated for 16 hours at 35° C., at the end of which time it was heated to 75° C. The precipitated polymer was isolated by filtration, and was washed and finally dried. Fibers obtained therefrom had a bar sticking temperature of 195° C., showed an excellent affinity for dyes, and were non-inflammable.

Example 18

The effect of the chloride monomer on the flammability of the polymers is illustrated in this example wherein only 20% of the monomeric material was chloride monomer. A solution of 2.5 g. of poly-N-isopropylacrylamide, 0.1 g. of potassium persulfate, 0.1 g. of potassium metabilsulfite, 1.5 g. of vinylidene chloride, and 6.0 g. of acrylonitrile in 100 cc. of water was heated for 16 hours at 35° C., after which time the temperature was raised to 75° C. The precipitated polymer was isolated by filtration and was washed and dried. Fibers obtained therefrom had a bar sticking temperature of 200° C. and showed excellent affinity for dyes, but such fibers would burn.

Example 19

A 2.5 g. portion of a 70:30 N-methyl methacrylamide-acrylonitrile copolymer was dissolved in 100 cc. of water containing 0.1 g. of potassium persulfate, 0.1 g. of potassium metabisulfite, 3.0 g. of vinyl chloride and 4.5 g. of methacrylonitrile. The resulting solution was then heated for 16 hours at 35° C. The resultant emulsion was then heated to 75° C. and the precipitated polymer was filtered out, washed with distilled water and dried. Fibers obtained from the polymer had a bar sticking temperature of 195° C., a high affinity for dyes, and were noninflammable.

Similarly improved results are obtained with other polymers prepared in accordance with the invention. The polymers obtained can be compounded with the usual compounding materials if desired such as pigments, dyes, fillers, softeners and the like in accordance with usual practices.

Other solvents which can be used for the preparation of fibers from the new polymers of my invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 percent by weight.

Instead of using an aqueous medium as is disclosed in a number of the above examples, it is possible to use organic solvents, such as acetonitrile, aromatic hydrocarbons, such as benzene, toluene, etc., liquid alkanes, such as n-heptane, etc., aliphatic ethers, acetone, etc. As noted above, organic solvents which are water soluble can be used along with water in the polymerization. The term dispersion as used herein is intended to include both true solutions and emulsions.

The polymers of my invention can also be used in the preparation of sheets, films, tapes, etc. In film form, the polymers can be employed as film base in the manufacture of either black-and-white or color photographic film, wherein the base supports a photosensitive emulsion layer or layers, such as silver halide emulsions.

The invention has been described in detail with particular reference to certain preferred embodiments thereof, but it will be understood that variations and modifications can be effected within the spirit and scope of the invention as described hereinabove and as defined in the appended claims.

This application is a continuation-in-part of my copending application Serial No. 316,061, filed October 21, 1952 now abandoned).

What I claim as my invention and desire secured by Letters Patent of the United States is:

1. The process which comprises heating, at a temperature of 15°–75° C. in water and in the presence of a peroxide polymerization catalyst, a mixture consisting of (A) from 60–95% by weight of polymerizable monoethylenic material containing at least 30% by weight of a member of the group consisting of vinyl chloride and vinylidene chloride, and (B) from 40–5% by weight of an isolated preformed polymer from the group consisting of (a) a homopolymer of an amide by the general formula:

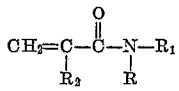

wherein R and $R_1$ are members of the group consisting of hydrogen and alkyl groups of from 1–4 carbon atoms and $R_2$ is a member of the group consisting of hydrogen and methyl, and (b) a copolymer of an amide represented by said formula and a compound from the group consisting of a different amide represented by said formula, acrylonitrile, vinyl acetate and methyl acrylate.

2. The process according to claim 1 wherein the said monomeric material (A) is a mixture of vinylidene chloride and acrylonitrile and wherein the said isolated preformed polymer (B) is poly-N-isopropyl acrylamide.

3. The process according to claim 1 wherein the said monomeric material (A) is a mixture of vinylidene chloride and acrylonitrile and wherein the said preformed isolated polymer (B) is poly-N-methyl methacrylamide.

4. The process according to claim 1 wherein the said monomeric material (A) is a mixture of vinylidene chloride and acrylonitrile and wherein the said preformed isolated polymer (B) is poly-N,N-dimethyl acrylamide.

5. The process according to claim 1, wherein the said monomeric material (A) is a mixture of vinyl chloride and acrylonitrile and wherein the said isolated preformed polymer (B) is poly-N-isopropyl acrylamide.

References Cited in the file of this patent

UNITED STATES PATENTS

| 2,123,599 | Fikentscher et al. | July 12, 1938 |
| 2,470,908 | Baer | May 24, 1949 |
| 2,620,324 | Coover et al. | Dec. 2, 1952 |
| 2,666,025 | Nozaki | Jan. 12, 1954 |
| 2,666,042 | Nozaki | Jan. 12, 1954 |

FOREIGN PATENTS

| 627,265 | Great Britain | Aug. 4, 1949 |
| 999,594 | France | Oct. 3, 1951 |
| 464,563 | Italy | July 9, 1951 |

OTHER REFERENCES

Hayes: Journal of Polymer Science, volume XI, pages 531–537.

Smets et al.: Jour. Polymer Science, volume 8, pages 289–311, March 1952.

Wakeman: The Chemistry of Commercial Plastics, page 403, Reinhold Pub. Co., New York, 1947.